United States Patent [19]
Kuhlman

[11] Patent Number: 4,738,581
[45] Date of Patent: Apr. 19, 1988

[54] VEHICLE MOUNTED WHEELCHAIR CARRIER

[76] Inventor: Harvey G. Kuhlman, N56W21466 Silver Spring Rd., Menomonee Falls, Wis. 53051

[21] Appl. No.: 11,786

[22] Filed: Feb. 6, 1987

[51] Int. Cl.$^4$ .............................................. B60R 9/06
[52] U.S. Cl. ............................... 414/462; 224/42.03 R; 414/921
[58] Field of Search ............. 414/462, 921, 540; 224/42.03 R, 42.03 B, 42.07, 42.44, 42.06

[56] References Cited

U.S. PATENT DOCUMENTS

| | | | |
|---|---|---|---|
| 3,567,052 | 3/1971 | Allen | 414/462 |
| 3,638,813 | 2/1972 | Strong | 414/921 X |
| 4,050,616 | 9/1977 | Mosow | 224/42.03 B |
| 4,071,260 | 1/1978 | Marshall | 414/540 X |
| 4,213,729 | 7/1980 | Cowles et al. | 414/462 |
| 4,297,069 | 10/1981 | Worthington | 224/42.03 R X |
| 4,397,607 | 8/1983 | Neill et al. | 414/462 X |
| 4,400,129 | 8/1983 | Eisenberg | 414/462 |
| 4,411,580 | 10/1983 | Kelly | 414/462 |
| 4,437,599 | 3/1984 | Jorgening | 224/319 |
| 4,544,321 | 10/1985 | Lanier | 414/542 |
| 4,573,854 | 3/1986 | McFarland | 414/462 |

FOREIGN PATENT DOCUMENTS 8002785 12/1981 Netherlands ..................... 414/462

*Primary Examiner*—Leslie J. Paperner
*Attorney, Agent, or Firm*—Andrus, Sceales, Starke & Sawall

[57] ABSTRACT

An automobile bumper mounted wheelchair carrier includes an extendible hydraulic cylinder secured to a known trailer-type bumper hitch. The piston member is vertically movable and includes a bottom chair support plate projecting outwardly of the bumper. In the lowered position, the support plate is located to receive the two rear wheels, or safety roller provided on the wheelchair. Upper lock members are aligned with the side frames of the wheelchair and one is releasably attached to the frame. The wheelchair is mounted in the in-use state. A pressurized hydraulic supply, either hand or electrically operated, is mounted in the vehicle trunk with lines releasably connected to the cylinder for raising and lowering of the support and wheelchair.

13 Claims, 2 Drawing Sheets

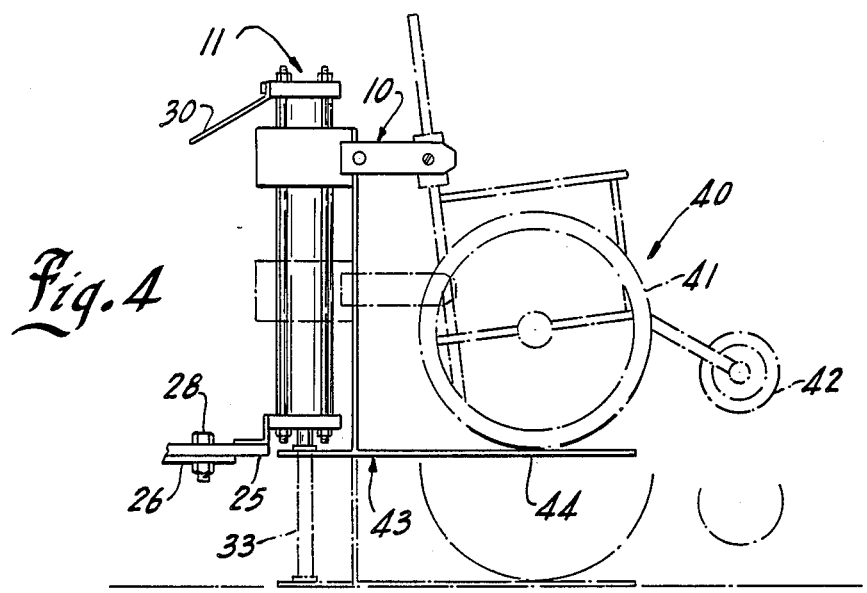
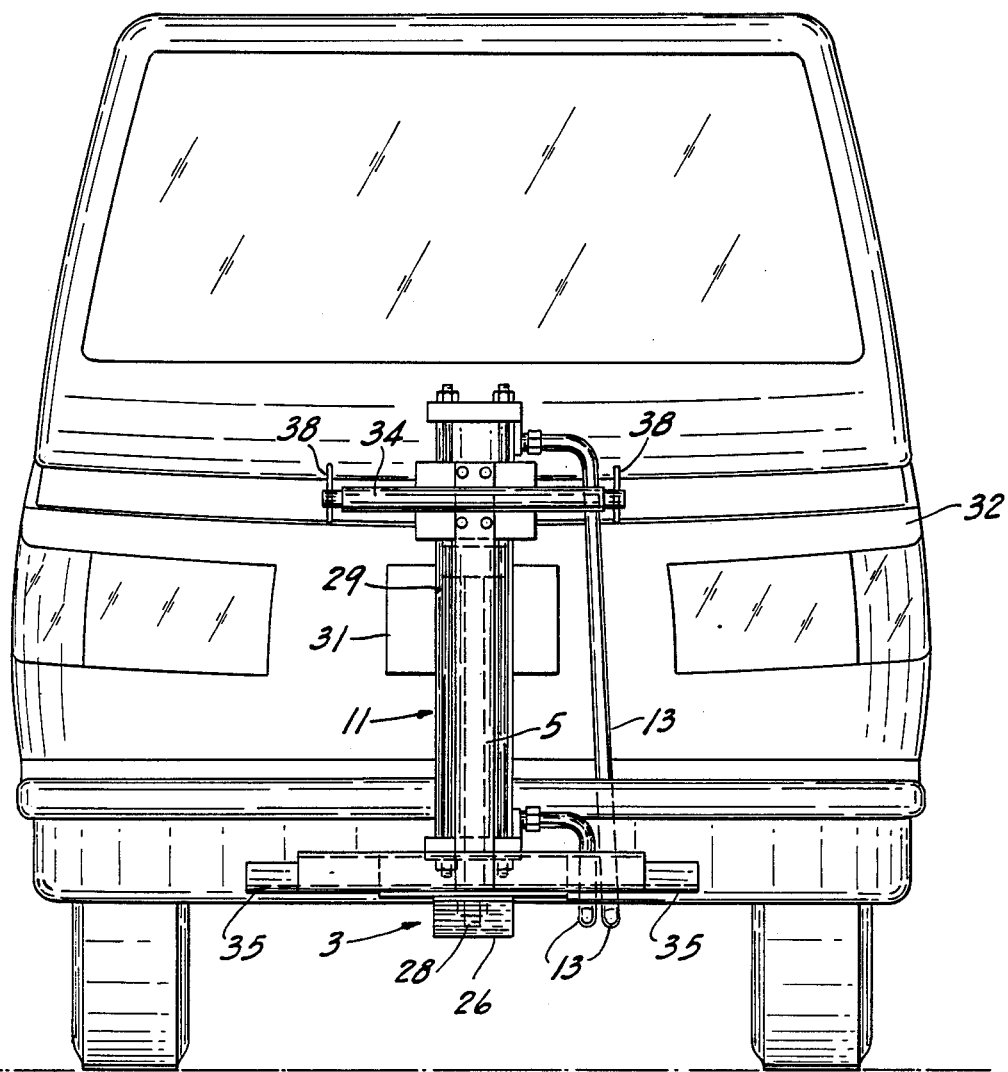

VEHICLE MOUNTED WHEELCHAIR CARRIER

BACKGROUND OF THE PRESENT INVENTION

This invention relates to a vehicle mounted wheelchair carrier and particularly to a wheelchair carrier adapted to be secured to the rear bumper of a vehicle for supporting of the wheelchair in the normal use state.

Wheelchairs are used by people with various physical impediments. Manually operated and collapsible wheelchairs are widely used as providing a reasonably inexpensive and convenient transport device. The wheelchair is conveniently collapsed not only for storage but for transport in an automobile or the like. Battery powered and motorized wheelchairs are also relatively widely used. Although substantially more expensive than the manually operated collapsible vehicle, the motor drive permits much more readily and easily manipulated and controlled movement of the wheelchair. In addition, depending upon the particular physical disability, the person themselves may not be able to manually move the conventional manually operated wheechair. In such instances, the motorized unit is essential to permit the convenient mobility of the person. Significant difficulty is presented by the motorized wheelchair in the transport of the wheelchair in another vehicle to provide the availability of the wheelchair to the person at different locations. Various suggestions and solutions have been made to improve the portability of the motorized or powered wheelchairs. A widely available commercial system provides a multiple part assembly which permits disassembly of the wheelchair into two or more basic components. When separated, the wheelchair is more conveniently placed in a vehicle trunk, back seat or other portions of an appropriate vehicle. Although this does provide a means of transport, the disassembled parts are relatively bulky and heavy. The disassembled unit therefore will still present an inconvenient if not very difficult task for the elderly who may be operating the transport vehicle, and thus required to disassemble and store the wheelchair as well as reassemble it.

Various lift means have also been suggested which permit the physical lifting of a wheelchair onto the top of the vehicle, or in the case of a van or truck-like vehicles inside of the vehicle. Typical suggestions are shown in U.S. Pat. Nos. 4,544,321 which issued Oct. 1, 1985 and 4,573,854 which issued Mar. 4, 1986.

Various lift suggestions have all also been made for collapsible wheelchairs of the more conventional type which have the fabric type seats and permit the collapsing of the sides of the wheelchair into closed spaced or abutting engagement. Typical suggestions are shown in U.S. Pat. Nos. 4,213,729 which issued July 22, 1980 and 4,397,607 which issued Oct. 27, 1981 and 4,411,580 which issued Oct. 25, 1983.

Although various automotive-mounted means are suggested for other types of vehicles such as motorbikes and the like which permit securing to the bumper, the devices are not adapted to the construction of a wheelchair. Thus for example, U.S. Pat. No. 3,567,052 which issued Mar. 2, 1971 discloses a simple rail U-shaped member extending parallel to a bumper and defining a channel for receiving the two wheels of a motorbike. The rail is pivotally mounted to the bumper at one end and adapted to be interconnected through a vehicle jack or the like for dropping of the opposite ends to a loading position for receiving of a motorbike and than raising thereof to a transport position through the use of a jack.

U.S. Pat. No. 4,397,607 which issued Aug. 9, 1983 discloses a winch powered wheelchair lift adapted to be interconnected through the trunk and bumper structure of a vehicle for lifting of a wheelchair upwardly over the bumper portion of a typical automobile with a protruding rear trunk structure, with the wheels resting on the bumper and held in place by flexible safety lines. The unit interferes with normal use of the trunk and presents some difficulty in assembly and disassembly from the vehicle if the lift device is to be attached and detached periodically.

There is therefore a continuing need and demand for a relatively simple, reliable and effective wheelchair carrier for releasable support of a wheelchair, and particular a motorized wheelchair, in the normal usage state and assembly; and particularly such a lift device which can be readily mounted to and detached from the vehicle.

SUMMARY OF THE PRESENT INVENTION

The present invention is particularly directed to a bumper mounted wheelchair carrier having powered means for moving of a wheelchair support between a lowered loading position and a raised transport position and constructed and arranged to receive and conveniently support a wheelchair in the normal use state. Generally in accordance with the present invention, the carrier includes a vertically extendible member in a support unit having an attachment means for attachment to the bumper. The attachment means can be a simple type of a bumper hitch such as presently widely used for interconnection to a trailer or other vehicle to be pulled behind the vehicle for the over-the-road movement. The extendible member is vertically mounted and includes a bottom chair support means projecting outwardly of the bumper. In the lowered position, the support means is located to receive the two rear wheels or roller elements of a safety arms secured to the rear of the wheelchair. With the elements in position, the upper portion of the wheelchair is locked to the vertically extended member. The extendible member is then powered to the raised position locating the wheelchair in the convenient transport mode. A power drive mechanism is coupled to the vertical support member and is provided with a suitable power control input for lowering and raising of the member. The power means is preferably a simple hydraulic powered cylinder located in a vertical orientation and having the one part mounted to the vehicle and the opposite part of the cylinder unit secured to the extendible member. A pressurized hydraulic supply is conveniently mounted within the trunk of the vehicle. Suitable hydraulic lines are connected to the supply and releasably connected to the cylinder unit to provide the necessary hydraulic liquid to the unit for raising and lowering of the extendible member. A simple control system is mounted in the trunk, and/or at a remote location such as adjacent the drivers station, for the convenient manipulation and positioning of the extendible member between a lowered loading position and a raised transport position.

The present invention thus provides a simple but a reliable and effective support for transport of a powered wheelchair in the use state. The support is readily constructed with present day technology and devices. The control of the device is also extremely convenient and readily operated by the elderly such that it can be used essentially without restriction by anyone authorized to operate an over-the-road vehicle.

BRIEF DESCRIPTION OF DRAWINGS

The drawings furnished herewith generally illustrate the best mode presently contemplated for carrying out the invention and are described hereinafter.

In the drawings:

FIG. 3 is a end view of the carrier with the wheelchair removed; and

FIG. 4 is a view similar to FIG. 1 illustrating an alternate embodiment.

DESCRIPTION OF ILLUSTRATED EMBODIMENTS

Figure 1:
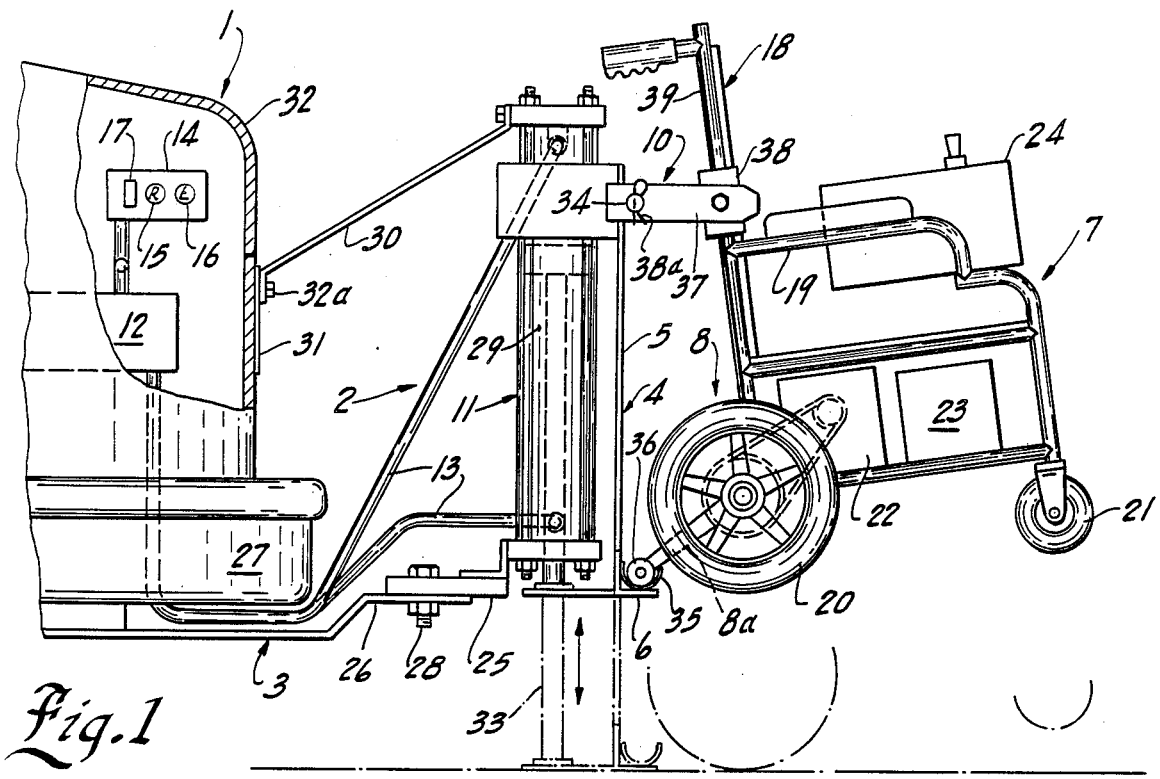
FIG. 1 is a pictorial view of a vehicle with an attached wheelchair carrier and having a wheelchair located in the transport position.

Referring to the drawing and particularly to FIG. 1, a vehicle such as a conventional automobile 1 is illustrated. A wheelchair carrier 2 constructed in accordance with the teaching of the present invention is secured to the rear vehicle hitch 3 which is secured to the rear vehicle bumper or frame structure. The carrier 2 includes a wheelchair support unit 4 having a vertically movable member 5. A wheelchair 7 is mounted to the carrier 2 with the wheelchair in the in-use state. Thus, the wheelchair 7 is completely assembled and upon lowering to the ground is directly in the inuse state or condition for receiving of the person to use the chair. The wheelchair 7 is mounted to the carrier 3 by first lowering of the carrier 2 to the ground position and backing of the wheelchair 7 onto the carrier 2. The illustrated chair 7 includes rear projecting safety arms 8 aligned with a lower support member 9 of the carrier unit 2 and the back of the wheelchair adjacent the upper end of vertical movable member 5. A releasable securement unit 10 on the upper end of vertical movable member 5 interconnects to the back of the wheelchair 7 to lock the wheelchair to the carrier 2. The vertical support unit 5 is then raised to the illustrated transport position shown in FIG. 1.

The support unit 4 is coupled to a power cylinder unit 11, and is powered between the lowered and raised position. In the illustrated embodiment of the invention, the power cylinder unit 11 is secured as an integral part of the carrier 2. A pressurized hydraulic source unit 12, shown mounted within the trunk of the vehicle, is interconnected through suitable hydraulic lines 13 to the power cylinder unit 11 for raising and lowering of the support unit. A push-button type control unit 14 is provided within the automobile trunk adjacent the hydraulic source 12 for simple control or coupling of the hydraulic source to the cylinder unit 11. The control 14 includes a lift button 15, a lower button 16 and an off button 17 to permit complete control of the positioning of the wheelchair 7.

In use, the vehicle operator positions the wheelchair to the position whereby the disabled person is able to conveniently move into the vehicle 1. To this end, the wheelchair 7 may also be specially constructed with a vertically positionable seat, not shown, which include a structure 8 to permit lowering and raising of the person in the wheelchair to the appropriate vertical positioning for most convenient transfer to and from the vehicle. After transfer of the individual, the operator wheels the chair 7 to the rear of the vehicle, and operates the lift mechanism 2 to drop the support unit 4 to the load position, moves and secures the wheelchair 7 in the in-use state onto the carrier 2 and raises the mounted wheelchair 7 to the transport position without disassembly or collapsing thereof. The wheelchair 7 is then in the position for direct transport. Upon arriving at the desired location, the reverse procedure is used to drop the wheelchair 7 and release it from the carrier 2 for positioning to receive the disabled person in a convenient ready and rapid manner. A suitable cover structure, not shown, may of course be provided to enclose the carrier during the transport position.

More particularly in the illustrated embodiment of the invention, the wheelchair 7 is illustrated as a typical motorized wheelchair. Thus the wheelchair has the seat structure 8, a back structure 18 secured between side frame 19. Large rear wheels 20 are provided in combination with relatively small front turn wheels 21. A drive motor 22 is coupled to the rear wheels for individual or simultaneous drive of the wheels. The motor 22 is energized from a rechargeable battery unit 23 secured to the understructure. A control unit 24 on the one side is mounted on the side arm of the vehicle to locate the controls in the convenient position for operation by the person while in the wheelchair. The motor drive is constructed in the usual manner to permit forward, rear and turning movements as desired by the operator. The wheelchair 7 is formed as a rigid interconnected assembly. Although such an assembly may be constructed to permit separation of the unit into subassemblies for storage, transport or the like, the chair may also be a single integrated structure. Either construction is conveniently transported by the wheelchair carrier 2 of the present invention. Thus, the illustrated wheelchair 7 is merely one typical structure for use with the present invention which is specially constructed to accommodate essentially all wheelchairs in the in-use state during transport on the present carrier.

The carrier 2 includes a vehicle mounted part 25 which can be secured to the ball hitch plate of a conventional hitch 3.

The attachment plate 26 projects rearwardly of the vehicle bumper 27 and part 25 is bolted thereto as by bolt and nut unit 28. In the illustrated embodiment, the power cylinder unit 11 is a conventional hydraulic cylinder unit having an outer cylinder 29 which is fixedly mounted to the hitch plate 26 by part 25, shown as a suitable bracket secured to the lower end of the cylinder. A relatively small 1½ inch diameter cylinder can readily accommodate the battery powered wheel chair. The bracket 25 provides a rigid support for the power cylinder. The upper end of the cylinder 29 may be further stabilized by attachment braces 30 connected between the top of the cylinder and releasably attached to the rear trunk wall 31 or other appropriate part of the vehicle, as by an attachment bolt 32 or other suitable attachment element. Thus, the illustrated vehicle is shown as a conventional vehicle having a rearwardly protruding trunk structure. The cover 32 of the trunk is free to be pivoted to permit access to the trunk.

A piston and piston-rod 33 is slideably journaled within the cylinder and extends downwardly from the lower end of the cylinder. The outer end of the rod 33 is connected to the vertically extendible or movable support plate 5 for raising and lowering thereof.

The connecting hydraulic lines 13 includes a pair of lines connected respectively to the opposite ends of the cylinder. By supplying liquid to the upper end of the cylinder and withdrawing fluid from the lower end, the support plate 5 is dropped to the ground loading position. Reversing the flow and supplying liquid to the bottom end of the cylinder 29 and withdrawing it from the upper top end automatically reverses and raises the support unit for raising of the wheelchair 7 to the transport position. The operation of control 14 provides appropriate setting and actuation of a hydraulic valve unit, not shown, of a well known construction for establishing the particular hydraulic connection. The off position de-energizes the hydraulic source unit and locks the carrier in the last position. The hydraulic source unit may be a suitable electrically driven hydraulic pump, or for purposes of reducing the cost, a simple hand manual operated pump may be used. Although a pneumatic system may be used, the size of the system would be unduly increased in size, and a hydraulic system is preferable. As the hydraulic source unit 12, control 14 and the control valve and the interconnection to the power cylinder 11 may be any well known or desired construction and no further description or explanation thereof is deemed necessary to fully understand and construct the present invention and no further description is given.

The illustrated support unit 4 consists of the rigid vertical plate 5 with the lower support 9 and an upper support member 34 secured to the opposite ends thereof to define a rigid support structure, generally of I-configuration, and a length somewhat less than the back of the wheelchair 7.

The lower support structure 9 is shown as a lateral cross beam. The beam is shaped as a generally tubular member. The upper portion at each end of the beam is removed to define a pair of upwardly and slightly forwardly opening channels thereby defining generally U-shaped supporting brackets 35.

The wheelchair 7 includes the outwardly and downwardly extended support arms 8 terminating in small wheels 36 generally conforming to the configuration and shape of the U-shaped brackets. The arms 8 are known safety devices required to limit rearard tilting of the wheelchair 7. In the assembled relation, the wheels or rollers 36 rest in the channel brackets 35 to firmly support the lower end of the chair structure.

The vertical side frame 19 of the wheelchair 7 are located within the other ends of the upper member 34 of the movable support unit 4. The member 34 is a rod welded or otherwise affixed to plate 5. Pivoted locking arms 37 of latch units 10 are secured to the side frame members 19 of the wheelchair. The locking arms 37 are each similarly constructed. Generally, the locking arms 37 are pivoted to a bracket 38 on the side frame 39 and are pivoted from a vertical depending position to project outwardly adjacent to the ends of upper corss support rod 34. The outer ends of arms 37 are apertured and have sufficient lateral movement to permit placing of arms onto the rod 34. Generally, U-shaped locking clips 38a pass through openings in the ends of the rod and lock the locking arms 37 to the shaft or rod 34 to hold and lock the wheelchair 7 to the carrier 2, with the lower arms 8 locked within the bottom U-shaped or channel brackets 35. The arms 37 are located on the side frame member 39 and have a length slightly less than the horizontal spacing of the wheels 36 from plate 5. The wheelchair 7 is thus pivoted about the supporting wheels in the brackets 35 to tilt the wheelchair slightly toward the trunk of the vehicle 1 with the arms 37 secured to the cross brace 34.

In the locked position, the arms 37 pivot the wheelchair upwardly toward the vehicle thereby tilting the back of the chair toward the vehicle slightly and distributing the load to provide the weight bearing on the brackets and providing a firm, reliable mounting of the motorized wheelchair to the carrier 2.

More particularly, with the wheelchair raised to the transport position, the upper end is tilted inwardly toward the vehicle such that the back of the wheelchair structure extends upwardly at a angular orientation toward the vehicle. The tilting of the wheelchair backwardly toward the vehicle redistributes the load characteristic with respect to the carrier and in particular moves the center of gravity rearwardly into or generally toward alignment with the lower support unit and thereby increases the stability of the wheelchair within the carrier for transport. Thus the motorized wheelchair is a relatively heavy assembly. the result of a motor mechanism and the battery as well as the rather rugged construction of the wheelchair. This establishes and maintains a minimum loading on the upper coupling mechanism and uses the weight of the mechanism to hold the assembly or the wheelchair in the carrier. The inventor has discovered that the angular orientation and support in the direct vertical support mechanism permits high speed transport of the wheelchair on the back-end to the back or to the aft end of a conventional automobile.

The angular orientation of the wheelchair also raises the outer extended end of the wheelchair above the plane of the cross arm support and thus reduces somewhat the outward extension from the vehicle. It also minimizes the probability of damage by physical engagement of the other end of the wheelchair.

Figure 2:
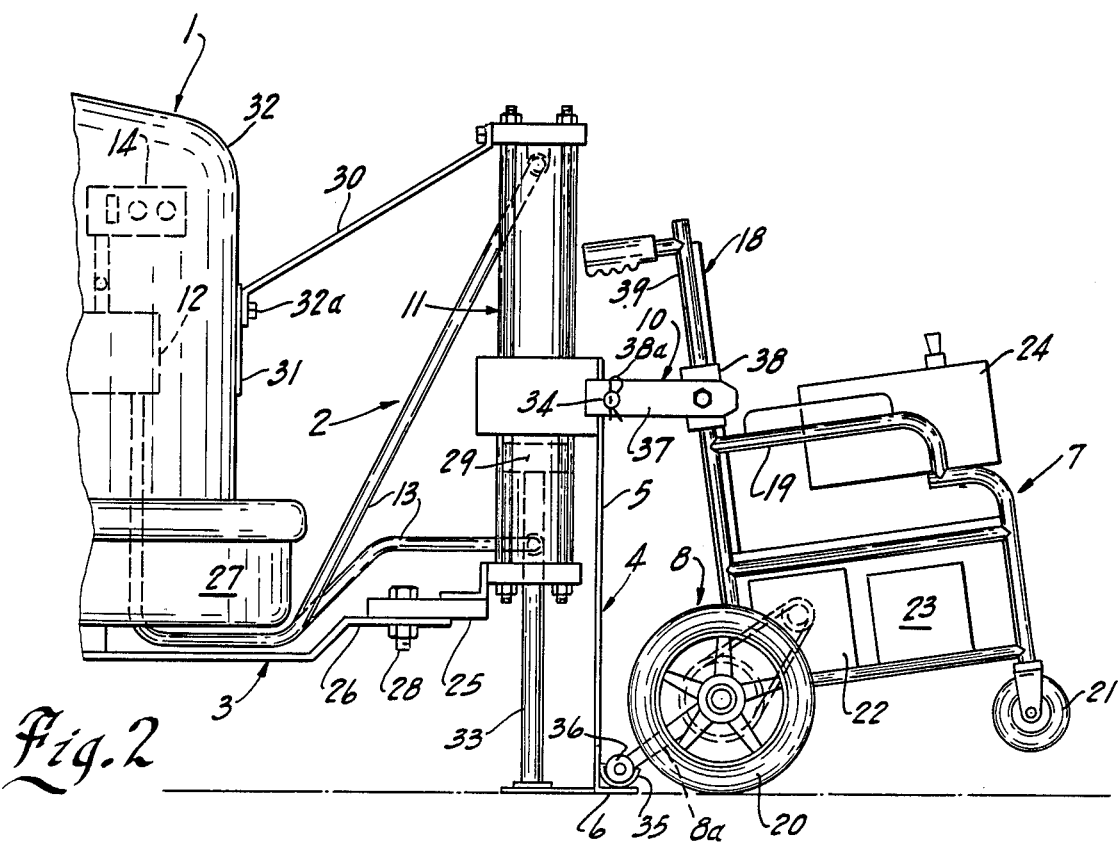
FIG. 2 is a view similarly to FIG. 1 illustrating the wheelchair carrier in the ground position for receiving and releasing the wheelchair from the carrier.

An alternate embodiment of the invention is shown in FIG. 4 for a wheelchair 40 which is not provided with the safety arms 35 as shown in FIGS. 1-3.

In FIG. 4, the wheelchair 40, shown in phantom, is formed with a large rear wheel 41 which permits manual positioning of the wheelchair and forward extended front wheels 42. A lower carrier support 43 is a simple heavy channel with a horizontal leg 44 which projects outwardly beneath the rear wheel 41. The carrier including the upper support lift mechanism and the control may be otherwise as shown in the embodiment and is therefore similarly shown in FIG. 4.

The illustrated embodiments of the invention provides a rugged yet simple carrier which can provide a safe, reliable mounting of a motorized or other wheelchair in the use state. This is of substantial significance in that such wheelchairs are of course relatively expensive. Further, it is important to provide a firm support for the system in view of the motor, battery and control systems associated and formed in an integrated, motorized wheelchair. However, the carrier unit is readily constructed using components which may be readily mass produced and available, as well as using standard available components for powering and positioning of the carrier. The carrier can be readily mounted and demounted with respect to the vehicle by the simple means of the coupling to the conventional trailer hitch and to the special stabilizing bolted braces where used.

The illustrated embodiments provides a highly significant practical embodiment of the present invention. However, the various details of the structure may of course be readily modified through the use of any other similar or desired construction providing the basic function of the direct lift support structure. Thus although shown as a hydraulic actuated mechanism, other suitable systems might be used. For example, an electric motorized or hydraulic motorized screw mechanism could also be used for the vertical positioning of the movable lift unit. Similarly the means of coupling to the bottom and the upper end of the wheelchair may use any one of the various types of mechanical latches and connections. It is important however to provide a firm reliable interconnection of the wheelchair to the movable support for the direct vertical positioning orientation of the wheelchair with respect to the vehicle.

Various modes of carrying out the invention are contemplated as being within the scope of the following claims particularly pointing out and distinctly claiming the subject matter which is regarded as the invention.

I claim:

1. A wheelchair vehicle carrier apparatus adapted to be releasably interconnected to a vehicle having a rear bumper for transport of the wheelchair in the inuse state and secured to the aft end of the vehicle comprising,
    a powered extendible support unit having a first member adapted to be interconnected to the aft end of the vehicle adjacent the rear bumper and having a vertically movable member located immediately outwardly of the bumper, said vertically movable member being a rigid member,
    a first multiple part coupling means having an upper first element secured to an upper portion of said vertically movable member and a second element connected to said wheelchair and adapted to establish a releasable interconnection of the upper end portion of the wheelchair to the upper end of of the vertically movable member,
    a second multiple part coupling means having a first lower element secured to a bottom portion of the vertically movable member and a second complementing lower element secured to the lower end of the wheelchair,
    said movable support member being constructed and arranged whereby said lower and upper elements of said wheelchair are aligned with the movable support unit in a lowered ground position to permit wheeling of said wheelchair onto said lower member and said wheelchair resting on the ground plane behind the vehicle and interconnection of said upper connector elements locks said wheelchair to said carrier, and
    powered means coupled to said vertically movable member and operable to move said vertically movable member toward and away from the ground plane of the vehicle.

2. The wheelchair vehicle apparatus of claim 1 wherein said vertically movable member is a rigid member mounted for vertical movement, and
    said power means includes a hydraulic cylinder unit having a cylinder mounted to the vehicle and piston rod rigidly connected to said rigid member and operable to move said rigid member toward and away from the ground plane of the vehicle.

3. The apparatus of claim 2 wherein said first and second multiple part coupling means establishing a rigid connection of the wheelchair to said rigid member.

4. The apparatus of claim 2 wherein said first coupling means includes an upper cross member of said rigid member and a pair of rigid limbs secured one each to the opposite ends of the cross member and to the sides of the wheelchair.

5. The apparatus of claim 4 wherein said second coupling means includes a lower cross member and said rigid member, said lower cross member having horizontal support elements with a lower member of said wheelchair resting thereon.

6. A vehicle mounted wheelchair carrier apparatus comprising,
    a support means adapted to be releasably connected to the rear structure of a vehicle and including means projecting outwardly of the rear vehicle and generally centrally of the vehicle,
    a vertically movable support member secured to said mounting means, said support member being a rigid member and movable vertically with respect to said mounting means,
    power means coupled to said movable support member and operable to vertically position said movable support unit between a lowered ground engaging load position and a raised transport position,
    control means for energizing of said power means for selectively raising and lowering of said movable support unit between said positions,
    a bottom connecting member secured to said movable support member and having laterally spaced means defining first and second lower support means generally spaced in accordance with the width of the wheelchair in the in-use state, a top connecting member having laterally spaced first and second upper support means generally spaced in accordance with the width of said wheelchair in the in-use state,
    said wheelchair having rear supporting wheels and having lower laterally spaced members extending rearwardly of said wheels of the wheelchair and adapted to engage one each of said correspondingly spaced bottom connecting members, top spaced members secured to the opposite side of said wheelchair and aligned with said top connecting members, releasable means for interconnecting of the top support members to the upper wheelchair spaced members and thereby firmly connect said wheelchair to said carrier for transport and whereby said wheelchair is adapted to be releasably interconnected to said carrier in the in-use state in the load position of the carrier and raised with said movable support to the transport position.

7. A vehicle mounted wheelchair carrier for transport of wheelchair in the in-use state on an over-theroad vehicle having a front and rear bumper means, comprising a vertical lift means having means for rigidly mounting of the lift to one end of the vehicle adjacent said bumper means, said lift means including a rigid vertically movable support located outwardly of the bumper means and having a lateral width at least substantially as wide as the back of the wheelchair in the in-use state, said support mounted for movement in a vertical plane immediately outwardly of said bumper means,
    releasable means for rigidly attaching the back of said wheelchair to said support with said wheelchair projecting outwardly of said support and said vehicle, and
    powered means coupled to said movable support to raise and lower said support in said vertical plane between a ground engaging position and a raised transport position aligned with the end of the vehicle adjacent the bumper means and with said wheelchair in essentially the same orientation on said support.

8. The vehicle mounted wheelchair carrier of claim 7 wherein said vertical lift means includes vertically spaced upper and lower support members extending laterally of the lift means and located for connection to a bottom portion of the wheelchair and to an upper portion of the wheelchair.

9. The vehicle mounted wheelchair of claim 7 wherein said powered means is a fluid cylinder establishing a linear vertical movement of said vertically movable support.

10. In combination, a carrier and motorized wheelchair for mounting of the releasably mounting of the wheelchair to the aft end of an automobile comprising, a trailer hitch secured to the aft end of the vehicle and having a horizontal bar extending outwardly immediately of the vehicle, said bar having a vertical opening, a power cylinder unit having a cylinder, a mounting arm rigidly affixed to the lower end of said cylinder and having a vertical opening, means passing through said opening and releasable connecting and firmly support said cylinder on said hitch arm, a support brace secured to the upper end of said cylinder and extending downwardly and inwardly to the rear wall of said vehicle, means connecting said brace to said vehicle to rigidly mount said cylinder to said vehicle, said cylinder unit having a piston and piston-rod assembly journaled in said cylinder and projecting downwardly and said piston-rod extending downwardly from said cylinder a rigid support member secured to said piston rod and projecting upwardly in line with said cylinder, a bearing guide member secured to the upper end of said cylinder and coupled to the upper end of said vertically movable member for guiding and supporting of said vertically movable member to said cylinder, a lower cross arm secured to the bottom edge of said vertically movable manner, said cross arm being a generally tubular member extending laterally of said vertically movable member and having a length at least as great as the length generally corresponding to the width of said wheelchair, the outer top wall of said tubular member is removed to define a similar cup-shaped bracket opening upwardly at each end of the lower cross arm, an upper cross arm secured to the upper end of said vertically movable manner and having an end lock opening at each end, first and second coupling arms secured one each to the opposite ends of said upper cross arms, a connecting pin releasably located in said openings, said wheelchair having first and second support members secured one each to each side of said wheelchair, each of said support members extending rearwardly and downwardly in terminating ends support wheels complementing said U-shaped brackets, said members being spaced laterally for alignment with said U-shaped brackets, coupling arms pivotally secured to the top of said wheelchair and pivotal to a substantially horizontal position extending rearwardly therefrom, said arms being laterally spaced and adapted to aligned with and telescoped over said cross arms, said clips adapted to be passed through said openings for locking of said wheelchair to said upper cross arm, hydraulic fluid supply source having first and second lines connected to said cylinder and for supplying and returning of oil from the opposite ends of said cylinder, said lines being connected one each to the upper end of said cylinder and to the lower end of said cylinder for providing of the interchange of oil between said cylinder for selective moving of said piston and piston-rod, a control valve having a manually operated control for selectively connecting of said lines to said cylinder for alternately lowering and raising of said movable support between a wheelchair loading position and wheelchair transport.

11. A vehicle mounted wheelchair carrier comprising, a mounting means for attachment to the trailing end of a vehicle and including a support unit located immediately behind said vehicle, said support unit being adapted to be lowered to a ground position for mounting of said wheelchair and to a raised position for transport of said wheelchair immediately behind said vehicle, said support unit including a rigid bottom support unit and a rigid upper support unit, means for releasably and firmly attaching the lower back end of the wheelchair to said lower support unit and the upper back end of said wheelchair to said upper support unit to form an essentially rigid connection preventing relative movement between said support unit and said wheelchair, said upper and lower supports being constructed and arranged to support said wheelchair in the transport position with the wheelchair pivoted about said bottom support unit with the back of said wheelchair extending upwardly at a selected angular orientation toward such vehicle and thereby redistributing and locating of the center of gravity generally toward alignment with said lower support unit and thereby establishing a firm reliable transport positioning of said wheelchair projection rearwardly from said carrier.

12. The carrier of claim 11 wherein said lower support includes a rigid flat plate projecting outwardly and adapted to receive the rear wheels of the wheelchairs for supporting therof.

13. The carrier of claim 11 wherein said lower support unit includes a pair of laterally spaced upwardly opening channel brackets, and said wheelchair has a pair of correspondingly spaced rear arms terminating in outer roll elements complementing said brackets and located therein with the wheelchair secured to said support unit.

* * * * *

UNITED STATES PATENT AND TRADEMARK OFFICE
CERTIFICATE OF CORRECTION

PATENT NO. : 4,738,581

DATED : April 19, 1988

INVENTOR(S) : HARVEY G. KUHLMAN

It is certified that error appears in the above-identified patent and that said Letters Patent is hereby corrected as shown below:

Abstract, line 2, cancel "extendible" and substitute therefor ---extendable---; Col. 2, lines 16-17, cancel "particular" and substitute therefor ---particularly---; Col. 3, line 13, cancel "similarly" and substitute therefor ---similar---; Col. 3, line 16, delete "a" and substitute therefor ---an---; Col. 3, line 39, cancel "9" and substitute therefor ---6---; Col. 4, line 59, cancel "32" and substitute therefor ---32a---; Col. 5, line 29, cancel "9" and substitute therefor ---6---; Col. 5, line 34, cancel "9" and substitute therefore ---6---; Col. 5, line 44, cancel "rearard" and substitute therefor ---rearward---; Col. 5, line 48, cancel "are" and substitute therefor ---is---; Col. 5, line 57, cancel "corss" and substitute therefor ---cross---; Col. 5, line 66, delete "member" and substitute therefor ---members---; Col. 6, line 13, delete "a" and substitute therefor ---an---; Col. 6, line 66, delete "provides" and substitute therefor ---provide---; Claim 1, col. 7, line 35, after "end of" delete "of"; Claim 6, col. 8, line 15, delete "mounting" and substitute therefor ---support---; Claim 6, col. 8, line 17, delete "mounting" and substitute therefor ---support---; Claim 6,

UNITED STATES PATENT AND TRADEMARK OFFICE
CERTIFICATE OF CORRECTION

PATENT NO. : 4,738,581

DATED : April 19, 1988

INVENTOR(S) : HARVEY G. KUHLMAN

It is certified that error appears in the above-identified patent and that said Letters Patent is hereby corrected as shown below:

col. 8, line 20, delete "unit" and substitute therefor ---member---; Claim 6, col. 8, line 24, delete "unit" and substitute therefor ---member---; Claim 6, col. 8, line 27, delete "means" and substitute therefor ---members---; Claim 6, col. 8, line 31, delete "means" and substitute therefor ---members---; Claim 6, col. 8, line 38, delete "bottom connecting" and substitute therefor ---lower support---; Claim 6, col. 8, line 42, delete "top" and substitute therefor ---upper---; delete "upper" and substitute therefor ---top---; Claim 7, col. 8, line 51, delete "over-theroad" and substitute therefor ---over-the-road---; Claim 9, col. 9, line 10, after "wheelchair" insert ---carrier---; Claim 10, col. 9, line 34, after "cylinder" insert ---,--- (comma); Claim 10, col. 9, line 39, after "movable" insert ---support---; Claim 10, col. 9, line 40, after "movable" insert ---support---; Claim 10, col. 9, line 43, delete "manner" and substitute therefor ---support member---; Claim 10, col. 9, line 45, after "movable" insert ---support---; Claim 10, col. 9, line 52, delete "manner" and substitute therefor ---support member---; Claim 10, col. 9, line 56, after "said" insert ---locking---; Claim 10, col. 9, line 59, after "downwardly" delete "in" and substitute therefor ---and---; Claim 10, col. 9, line 60, delete "ends" and substitute therefor ---in---; Claim 10, col. 10,

UNITED STATES PATENT AND TRADEMARK OFFICE
CERTIFICATE OF CORRECTION

PATENT NO. : 4,738,581

DATED : April 19, 1988

INVENTOR(S) : HARVEY G. KUHLMAN

It is certified that error appears in the above-identified patent and that said Letters Patent is hereby corrected as shown below:

line 1, delete "members" and substitute therefor ---wheels---; Claim 10, col. 10, line 4, before "coupling" insert ---said---; Claim 10, col. 10, line 8, before "clips" insert ---connecting pins being---; Claim 10, col. 10, line 10, after "arm," insert ---and---; Claim 11, col. 10, line 39, after "lower" delete "supports" and substitute therefor ---support units---; Claim 12, col. 10, line 50, before "includes" insert ---units---; Claim 12, col. 10, line 51, delete "wheelchairs" and substitute therefor ---wheelchair---; Claim 12, col. 10, line 52, delete "therof" and substitute therefor ---thereof---; Claim 13, col. 10, line 58, after "said" insert ---lower---

Signed and Sealed this

Third Day of October, 1989

Attest:

DONALD J. QUIGG

*Attesting Officer*   *Commissioner of Patents and Trademarks*